FIG. 1

L. W. PROEGER.
APPARATUS FOR MAKING GLASSWARE.
APPLICATION FILED MAR. 6, 1911.

1,056,579.

Patented Mar. 18, 1913.
6 SHEETS—SHEET 5.

WITNESSES.

INVENTOR.

UNITED STATES PATENT OFFICE.

LUIS W. PROEGER, OF PITTSBURGH, PENNSYLVANIA.

APPARATUS FOR MAKING GLASSWARE.

1,056,579.

Specification of Letters Patent.  Patented Mar. 18, 1913.

Application filed March 6, 1911. Serial No. 612,562.

*To all whom it may concern:*

Be it known that I, LUIS W. PROEGER, a citizen of the United States, and resident of Pittsburgh, in the county of Allegheny and State of Pennsylvania, have invented a new and useful Improvement in Apparatus for Making Glassware; and I do hereby declare the following to be a full, clear, and exact description thereof.
My invention relates to machines for manufacturing bottles or other glass articles.

The object of my invention is to provide a simple and efficient form of machine for manufacturing, more particularly narrow neck bottles, the machine being entirely automatic, and the operations of forming the blank and blowing the bottle following in quick succession, so that no time is lost and the capacity of the machine will be very high.

It is impossible in a general way to enumerate in the premises the numerous features of novelty involved in my machine and I will therefore refer those skilled in the art to the following specification and claims for a full understanding of my invention.

In the accompanying drawings
Fig. 2 is a section on the line 2—2 Fig. 1;
Fig. 3 is a section on the line 3—3 Fig. 1;
Fig. 4 is a section on the line 4—4 Fig. 3;
Fig. 6 is a detail of the cam mechanism for operating the neck mold;
Fig. 7 is a like view of the opposite side of said cam mechanism;
Figs. 15 and 16 are detail views of blowing valves.
Referring to the drawings the numeral 2 designates a suitable base or platform which may be mounted on wheels so that the machine may be easily transferred from one part of the factory to the other. Stepped in the base 2 is the column or shaft 3. The hollow shaft or sleeve 4 surrounds the column 3, and bolted or otherwise secured to said hollow shaft 4 is the plate or table 5. The table 5 rests upon the pedestal 6 on the base 2 and the ball-bearings 7 are interposed between said pedestal and the table 5 to facilitate the rotary movement of said table.

Secured to the lower face of the table 5 is the star-wheel 8 which has the radial grooves 9. The segment 10 is mounted on the shaft 11 and the arm 12 of said segment has the stud or roller 13 which is adapted to engage the radial grooves 9 to impart an intermittent movement to the table 5, as fully hereinafter set forth. The curved portion of the segment 10 will fit within the depressions 14 of the star-wheel 8 when the roller 13 is not in engagement with one of the grooves so as to block or prevent the radial movement of said star-wheel.

The shaft 11 is mounted in bearings 15 in the base 2 and to the lower end of said shaft is secured the gear-wheel 16. This gear-wheel 16 is engaged by the gear-wheel 17 on the vertical shaft 18. A worm-wheel 19 on the shaft 18 is engaged by a worm 20 mounted on the upright 21. In this manner power is transmitted from the worm-shaft 20 through the intermediate gears to rotate the segments 10 and through it impart an intermittent movement to the table 5.

The blow-molds 22 are carried on the table 5 and said blow-molds consist of the ordinary vertical hinged sections connected by the pins 23. Each mold section has the lugs 24 and links 25 are pivotally connected to said lugs and to the yoke 26. This yoke 26 is connected to the sliding-block 27 which has the stud 28 moving in the groove 29 of the guide-plate 30. This guide-plate 30 is bolted or otherwise secured to the rotary hollow shaft 4 and the grooves 29 radiate from the center of said guide-plate one for each blow mold. The sliding-block 27 is further provided with the stud or roller 32 which engages the cam-way 33 in the stationary cam 34. This cam 34 is held stationary by being secured to the casting 35, said casting being bolted or otherwise secured to the arms 36. The arms 36 extend out and are connected to the stationary frame 37, said arms being arranged so as not to interfere with any of the parts during the rotary movement of the molds.

The casting 35 has at its upper end the cam-way 38 which operates in connection with the cam 39 carried by one of its stationary arms 36. The cam 39 has the cam-way 40 which is parallel with the cam-way 38. The short racks 41 and 42 are secured to the casting 35 at certain positions with reference to the cam-way 38 for the purpose more fully hereinafter set forth. A cam-guide 43 is bolted or otherwise secured to the casting 35 and the guide 44 is secured to the cam 39.

Figure 8:
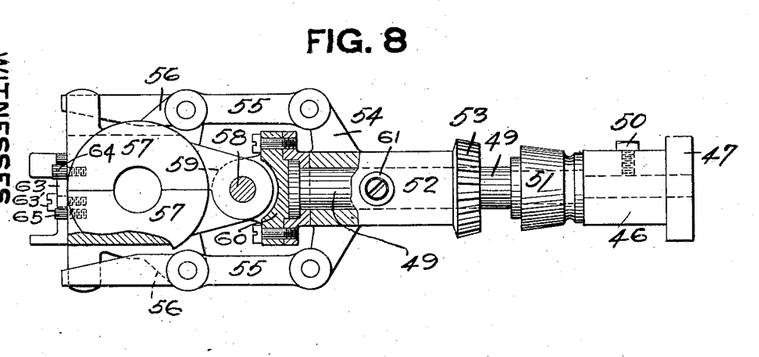
Fig. 8 is an enlarged detail of the neck mold and the means for opening and closing the same.

The hollow-shaft 4 is provided with the vertical guide-ways 45. Short sleeves 46 are provided with the heads 47 which are adapted to engage the guide-ways 45 so that said sleeves are adapted to move up and down in said guide-ways and are supported against outward movement by the plates 48 engaging said heads 47. The shafts 49 are inserted in the sleeves 46 and are held therein by the set-screws 50 as clearly shown in Fig. 8. Bevel-rollers 51 are loosely mounted on the shafts 49, and said rollers are adapted to rest upon and travel on the cam-way 38. Beyond the rollers 51 are the sleeves 52 which are loosely mounted on the shafts 49 and bevel-gears 53 are carried by the sleeves 52. The sleeves 52 have the yokes 54 which are connected to the links 55 the outer ends of said links being connected to the lugs 56 on the halves of the neck-mold 57. The halves of the neck-mold are connected by the vertical pins 58 and said pins also pass down through the lugs 59 on the swivel 60, said swivel being mounted on the shaft 49.

The sleeves 52 are provided with the studs or rollers 61 which are adapted to engage the cam-way 62 carried by the casting 35 for the purpose of opening the neck-mold as fully hereinafter set forth.

Figure 9:
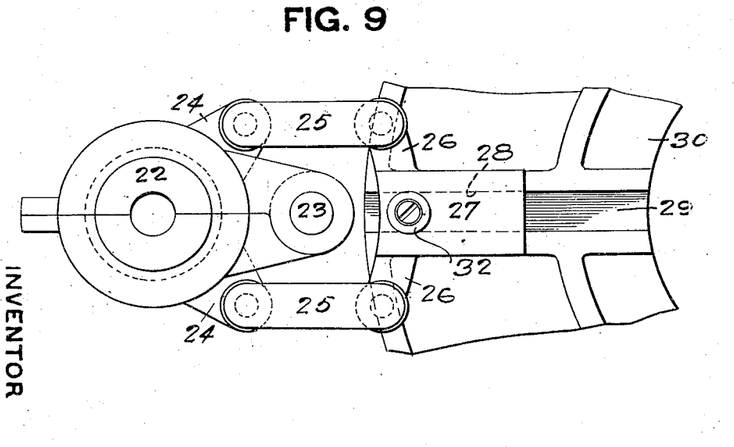
Figs. 9 and 10 are enlarged details of the blow mold and the means for opening and closing the same.
Figure 10:
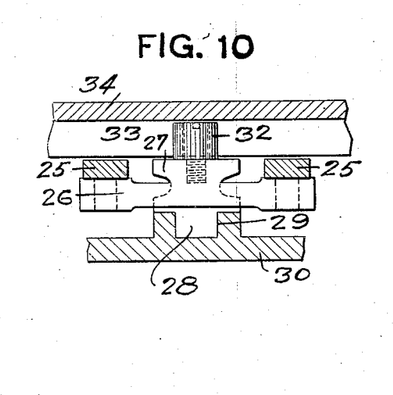
Figure 11:
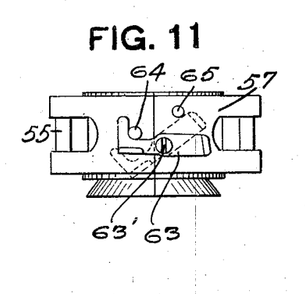
Fig. 11 is a view of the mechanism for locking the neck mold.

The neck-mold 57 is provided with the latch 63 which is pivoted at 63', said latch when thrown to the horizontal position engaging the pin 64 on one of the halves of the neck-mold. A pin 65 acts as a stop for the other end of the latch. This latch is operated automatically by the fingers 66 and 67 which are in the path of the movement of the neck-mold at positions indicated in Fig. 4 for locking and unlocking the neck-mold as fully hereinafter set forth. At the upper end of the hollow sleeve 4 and secured thereto is the spider 68. This spider carries at the outer end of its arms the blank-molds 69. The halves of the blank-molds are connected by the pins 70 and said blank-molds are opened and closed by the same form of mechanism as indicated in Fig. 9 in connection with the blow-mold. The guide-plate 71 corresponds to the guide-plate 30 and the lugs 72 engage with the grooves in said guide-plate 71. The yoke 73 is connected to the guide-lug 72 and said yoke is connected at its ends by links 74 to the mold-halves. A stud or roller 75 on the guide-lug 72 engages the cam-way 76 in the stationary cam 77. This cam 77 is secured to the stationary cam 39 and is thus held against rotary movement.

An arm 78 is carried by the column 3 and this arm in conjunction with the arm 79 on the upright 80 supports the cylinder 81. Within the cylinder 81 is the piston 82. Compressed air or other motive fluid is admitted to the upper end of the cylinder 81 to act on the plunger 83 to lower the piston 82. Connected to the piston-rod 84 is the closure or cap 85 which closes one end of the blank-mold. Air is admitted by the pipe 86 which passes down through the cap 85 into the mold.

Secured to the piston-rod 84 is the collar 87 and said collar carries the fork 88, which, when the piston-rod is lowered, is adapted to engage the lugs 89 on the halves of the mold and so lock and hold the mold halves securely together.

Figure 1:
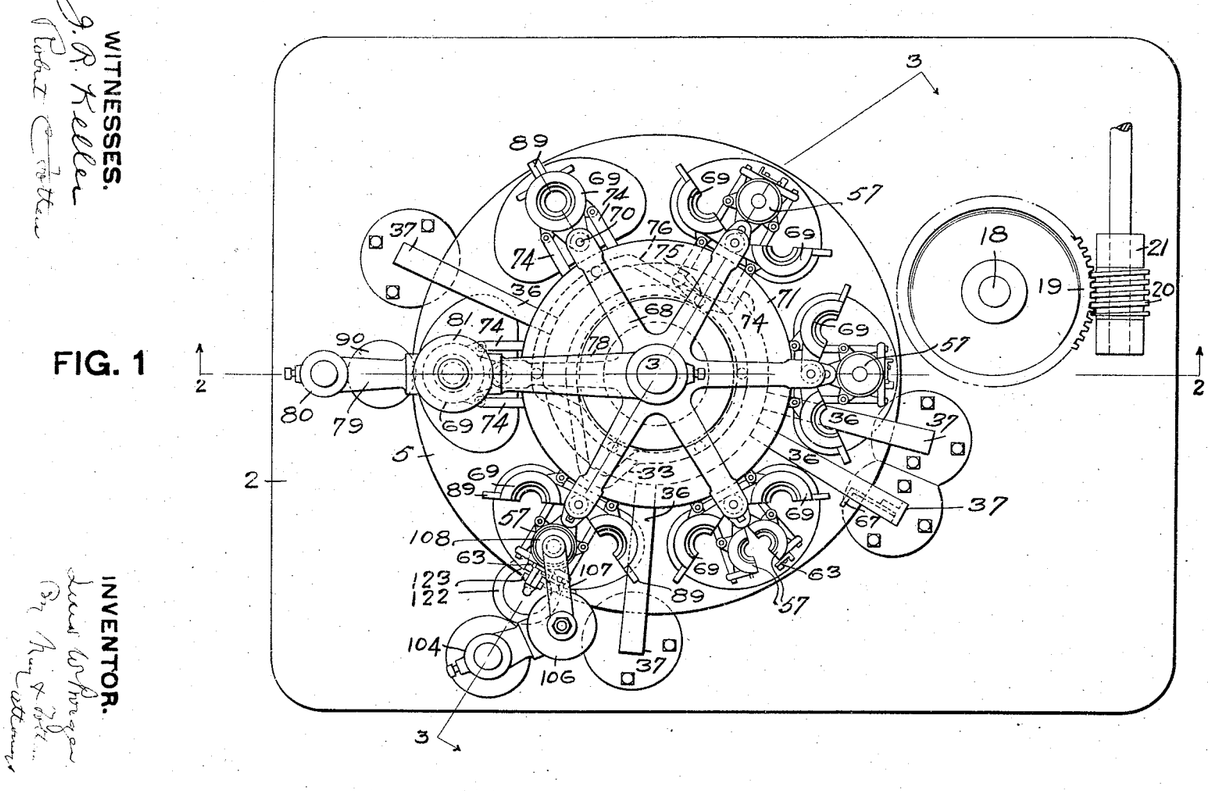
Figure 1 is a plan view of my improved machine.
Figures 2, 16:
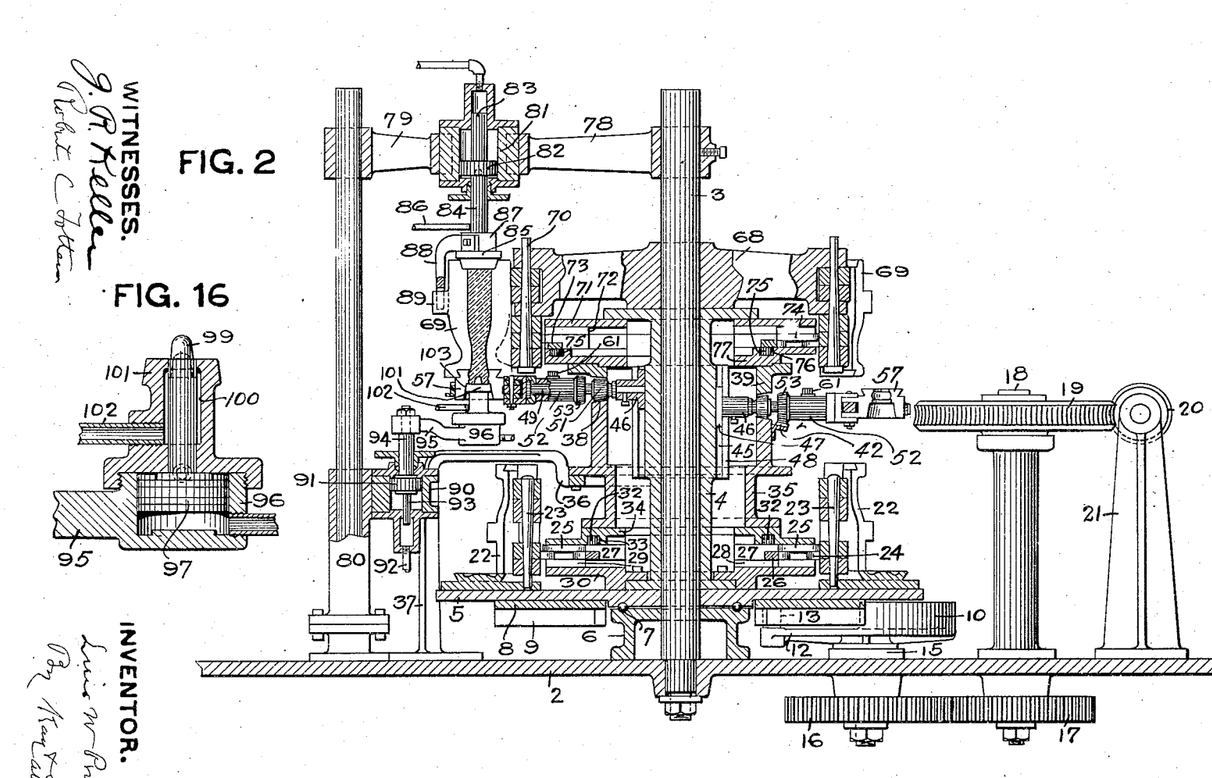

The cylinder 90 is supported by the upright 80 and within said cylinder is the piston 91. A pipe 92 admits air to said cylinder to move the plunger 93. A piston-rod 94 is connected to the piston 91 and an arm 95 on said piston-rod carries the small cylinder 96. The plunger 97 is contained within the cylinder 96 and said plunger has the stem 98 which has the tapering tip 99. The stem 98 of the plunger enters the chamber 100 in the plug 101. A pipe 102 delivers air to this chamber 100. The plug 101 is lifted by the piston 91 so as to enter the tapering seat 103 in the neck-mold, as clearly indicated in Fig. 2.

Figures 3, 15:
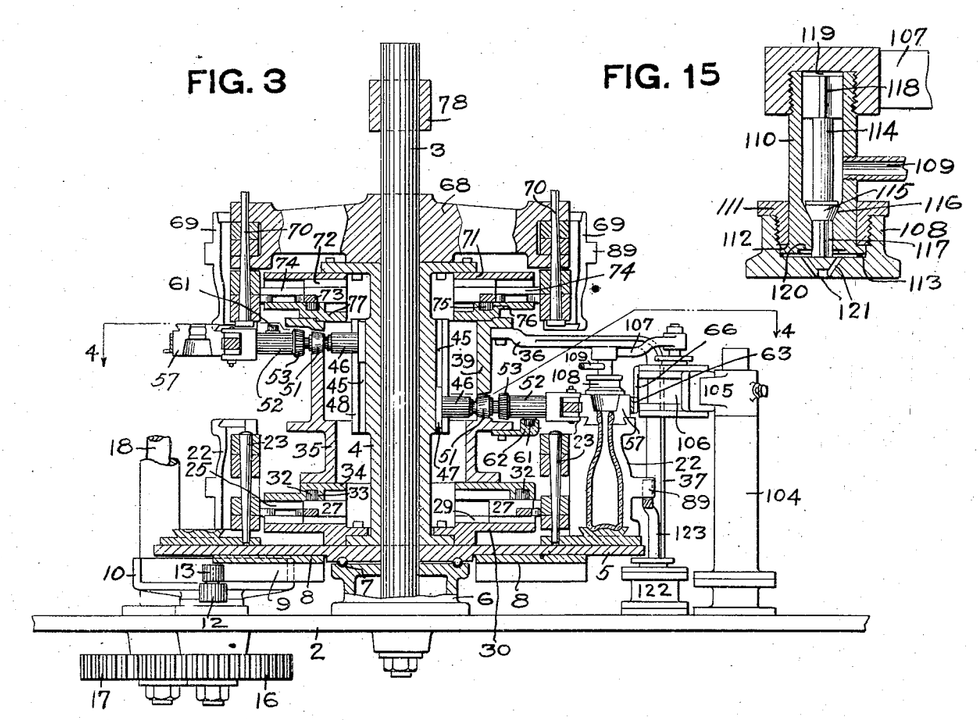

The upright 104 has the arm 105 which carries the cylinder 106. An arm 107 is connected to the piston of this cylinder and said arm carries the cap or closure 108. The pipe 109 admits air to the cap for the blowing operation. In Fig. 15 I have illustrated in detail the manner in which the air is admitted to blow the bottle. The tubular connection 110 enters the cap 108 and a sleeve 111 engages the shoulder 112 on said tubular connection, there being a space 113 left between the lower end of said tubular connection and the inner bottom face of the cap 108. Contained within the connection 110 is the valve-stem 114 which has the valve 115 which rests on the seat 116. Below the valve 115 is the extension 117 with radially extending web portions which rests on the inner bottom face of the cap 108. The upper end of the stem 114 has the webbed extension 118, which is slightly separated from the upper end of the connection 110 leaving the space 119. A slight depression or cavity 120 is also formed in the lower end of the connection 110. Air ports 121 are formed in the cap 108 for the purpose fully hereinafter set forth.

A cylinder 122 is provided to operate the locking fork 123 to lock the sections of the blow mold in the same manner as the locking fork 88 of the blank mold.

The operation of my improved bottle making machine is as follows: At the point indicated as the "charging" position the neck-mold and its corresponding blank-mold at that point in the travel of the rotary-frame will be closed, while the corresponding blow-mold on the table 5 below and in line therewith will be open. The necessary amount of glass at the proper consistency for blowing is introduced in any suitable manner into the opening of the neck-mold. When the glass has been so introduced, the rotary-frame, which is intermittently operated by the segment 10 engaging one of the grooves 9 of the star-wheel the blank-mold and neck-mold, will be moved from the "charging" position to the next position where the neck is formed and the blank prepared for the blowing operation. The mold in this position is clearly shown in Fig. 2 where the air has been admitted to the cylinder 81 to lower the closure 85 down into the open end of the blank-mold 69 while at the same time air is admitted to the cylinder 90 to lift the arm 95 and the plug 103 up into the neck-mold 57. Air is then admitted by the pipe 86, and passes down through the closure or cap 85 into the blank-mold where the pressure of the air tends to force the glass down within the mold to fill up the cavities of the neck-mold compactly, so as to form a perfect neck within the neck-mold. At the same time that the closure 85 is lowered into the blank-mold the lock 88 is also lowered and engages the lugs 85 so as to lock the blank-mold securely. Air is now admitted to the lower end of the cylinder 81 to raise the closure 85 and at the same time unlock the mold, while at the same time air is admitted by the pipe, but previous to this movement of the closure the air is withdrawn from the cylinder 96 to allow the plunger 98 to be lowered to the position connected in dotted lines Fig. 16. This lowering of the plunger 98 will open the port in the plug 101 and air can pass through the pipe 102 around the tapering tips 99 of the plunger 98 and this air so admitted will act to form a slight cavity in the neck end of the blank mold as indicated in dotted lines Fig. 2. The plug 103 is then lowered by releasing the air from the cylinder 90 and at this stage in the operation the rotary-frame once more rotates and the roller 75 passes into that portion of the cam-way 76 which will draw the roller toward the center of the cam, the block 72 moving in the radial guide in the guide plate 71. This will act to open the blank-mold and just as soon as the blank-mold is opened, the bevel-gear 53 of the neck-mold by which the blank is carried will engage the rack 41, the roller 51 at the same time descending the cam-way 38. This engagement of the bevel-gear 53 with the rack 41 will act to turn the neck-mold on its swivel 60, the sleeve 52 turning on the shaft 49. This inverting of the neck-mold will bring the blank carried thereby into its upright position where it is received by the open blow-mold in line therewith and below on the table 5. The undue elongation or stretching of the blank in this transfer from the blank-mold to the blow-mold is prevented by the fact that in the turning of the blank in moving from its upright position in the blank-mold to a like position in the blow-mold is at the same time moving in the same direction as the machine, and consequently the effect of the centrifugal force in the rotating of the blank is practically eliminated, and at the same time the blank is lowered from the level of the blank-mold to the level of the blow-mold by the travel of the bevel-wheel 51 down the incline of the cam-way 38. The guides 43 and 44 are engaged by the roller 53 in its descent so that it is properly guided.

Figures 4, 6, 7:
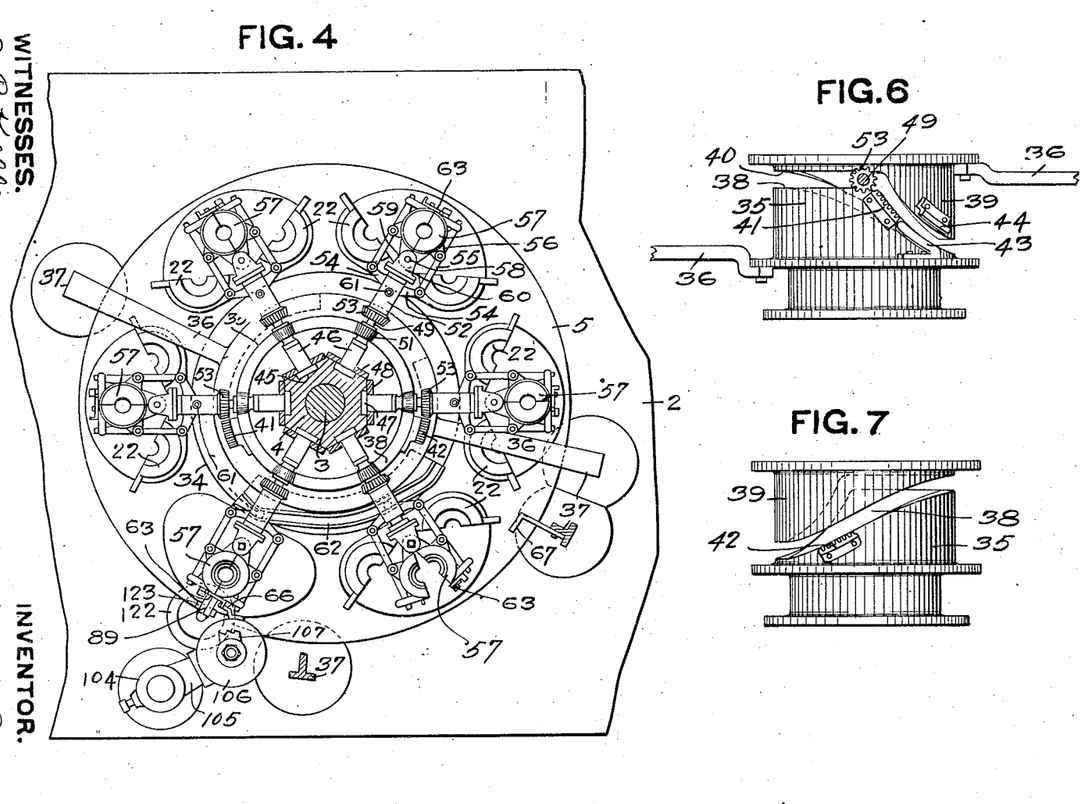
Figures 5, 12, 13, 14:
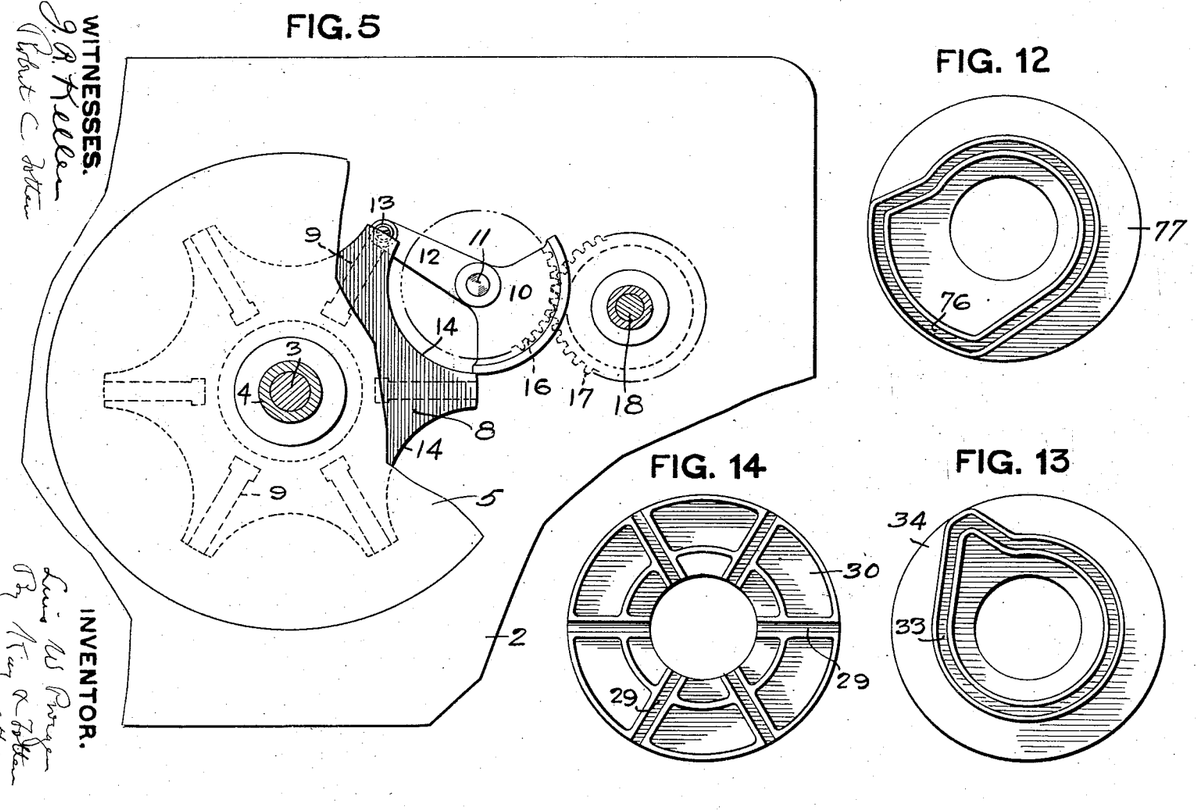
Fig. 5 is a plan view of the mechanism for imparting an intermittent movement to the machine.
Fig. 12 is a plan view of the blank mold cam.
Fig. 13 is a plan view of the blow mold cam.
Fig. 14 is a plan view of the slide guide for the opening and closing of the blank mold and blow mold.

As stated above the blank thus carried by the neck-mold and inverted by the action of the cam-way 38 is brought down in position to be engaged by the blow-mold and just as soon as the blank is positioned in the blow-mold the cam 34, by the engagement of its cam-way 33 with the stud or roller 32, will act to close the blow-mold around the blank, as indicated in Fig. 4. At this stage in the operation the rotary frame again comes to a standstill and the blowing of the bottle in the blow mold then takes place. As soon as the rotary frame comes to a state of rest, air is admitted to the cylinder 106 and the closure or cap 108 is lowered as indicated in Fig. 15. When the closure 108 has been seated in this way, the further downward movement of the arm 107 will force the connection 110 down until it strikes the bottom of the closure 108, whereupon the valve 115 is free from the seat 116 and air admitted by the pipe 109 will pass down through the valve and by the ports 121 into the blank to blow the bottle to the finished form, as shown in Fig. 3.

When the bottle has been blown in this manner the air is admitted to the cylinder 105 to raise the arm 107 and the closure carried thereby, but before the closure rises the connection 110 will be lifted so as to cut off the supply of air to the bottle, and upon a further movement of the arm 107 the closure will be lifted. As soon as the closure has been lifted the rotary motion is again imparted to the machine and the roller 32 engages that part of the cam-way 33 of the cam 34 which will open the blow-mold and at the same time the roller 61 on the sleeve 52 connected to the links which open and close the neck-mold will engage the cam-way 62 and the neck-mold will be opened as clearly shown in Fig. 4. At this point the machine again comes to a stand-still and the finished bottle is removed from the opened blow-mold and neck-mold, and on the next movement of the machine the neck-mold is closed by the action of the cam-way 62 and the neck-mold is locked by the latch 62 coming into engagement with the finger 67 with the neck-mold in this closed position. The bevel-gear now engages the rack 42 of the cam 38 and as the neck-mold ascends the cam, it is turned by the action of the rack 42 and it continues on up the cam-way 39 until it is brought to a horizontal position whence it travels around until it again arrives at the "charging" position where the operation just described is repeated. It is, of course, to be understood that while we have followed the movements of one neck-mold in the operation of making a bottle, that the other neck-molds have each been going through the same operations so that each time the machine makes one of its intermittent movements a bottle is finished.

What I claim is:

1. In a machine for making glass articles, the combination with a rotary frame, of a permanently inverted blank-mold and a blow-mold one above the other, a support, a rotary neck-mold carried by said support, means for bringing said neck-mold into operative position with reference to said blank-mold, means for turning said neck-mold and simultaneously lowering said support to bring said neck-mold into operative position with reference to the blow-mold.

2. In a machine for making glass articles, the combination with a rotary frame, of a permanently inverted blank-mold and a blow-mold one above the other, a support, a rotary neck-mold carried by said support, means for bringing said neck-mold into operative position with reference to said blank-mold, and means for turning said neck-mold in the same direction in which said rotary frame is moved to bring said neck-mold into operative position with reference to the blow mold.

3. In machines for making glass articles, the combination with a rotary frame, of a permanently inverted blank-mold and blow-mold one above the other, a support, a rotary neck mold carried thereby, means for bringing said neck-mold into operative position with reference to said blank-mold, a vertical guide on said frame with which said neck-mold engages, and means for turning said neck-mold and simultaneously lowering said support to bring said neck-mold into operative position with reference to the blow-mold.

4. In a machine for making glass articles, the combination with a rotary frame, of a permanently inverted blank-mold, and a blow-mold one above the other, a support, a rotary neck-mold carried thereby, and a cam device engaged by said support to raise and lower said support to bring said neck-mold into operative position with reference to said blank-mold and blow-mold.

5. In machines for making glass articles, the combination with a rotary frame, of a permanently inverted blank-mold and a blow-mold one above the other, a support, a rotary neck-mold carried thereby, a cam device engaged by said support to raise and lower same, and means for turning said neck-mold during the lowering and raising of said support.

6. In a machine for making glass articles, the combination with a rotary frame, of a permanently inverted blank-mold and a blow-mold one above the other, a support, a rotary neck-mold carried thereby, a cam device engaged by said support for raising and lowering the same, a pinion carried by said neck-mold, and racks engaged by said pinion to turn said neck-mold.

7. In a machine for making glass articles, the combination with a rotary frame, a permanently inverted blank-mold and blow-mold one above the other, a support, a rotary neck-mold carried thereby, a cam device engaged by said support for raising and lowering same, a pinion carried by said neck-mold and racks on said cam device in position to be engaged by said pinion during the lowering and raising of said support.

8. In a machine for making glass articles, the combination with a rotary frame, of a permanently inverted blank-mold and blow-mold one above the other, a support, a rotary neck-mold carried thereby, a cam device comprising a lower stationary member, an upper stationary member and cam-way formed between said members and engaged by said support, and means for turning said neck-mold during the downward and upward movement of said support while in engagement with said cam-way.

9. In a machine for making glass articles, the combination with a rotary frame, of an inverted blank-mold and blow-mold one above the other, a vertical guide on said frame, a slidable member in said guide, a shaft supported by said slidable member, a swivel connection between said shaft and said neck-mold, and means for raising and lowering said neck-mold and turning the same to bring said neck-mold into operative position with reference to said blank-mold and blow-mold.

10. In a machine for making glass articles, the combination with a rotary frame, of a blank-mold and blow-mold one above the other, a neck-mold, a vertical guide-way in said frame, a slidable member in said guide-way, a shaft carried by said member, a swivel-connection between said shaft and said neck-mold, a pinion connected to said neck-mold on said shaft, means for raising and lowering said neck-mold, and racks engaged by said neck-mold.

11. In a machine for making glass articles, the combination with a rotary frame, of an inverted blank-mold and blow-mold one above the other, a neck-mold, a vertical guide on said frame, a supporting member engaging said guide, a shaft supported by said supporting member, a swivel connection between said shaft and said neck-mold, a pinion connected to said neck-mold, a cam device having a cam-way on which said movable member travels for raising and lowering said neck-mold, and racks engaged by said pinion to turn said neck-mold.

12. In a machine for making glass articles, the combination with a rotary frame, of an inverted blank-mold and a blow-mold one above the other, the rotary neck-mold, a shaft on which said neck-mold is mounted, a slidable sleeve on said shaft, connections between said sleeve and each half of the neck-mold, a projection on said sleeve, and a cam engaged by said projection for opening and closing said neck-mold.

13. In a machine for making glass articles, the combination with a rotary frame, of an inverted blank-mold and a blow-mold one above the other, a rotary neck-mold, a shaft on which said rotary neck-mold is mounted, a slidable sleeve on said shaft, a yoke connected to said sleeve, connections between said yoke and each half of the neck-mold, a projection on said sleeve, a cam engaged by said projection, and means for bringing said neck-mold into operative position with reference to the blank and blow-mold.

In testimony whereof, I the said LUIS W. PROEGER have hereunto set my hand.

LUIS W. PROEGER.

Witnesses:
ROBT. D. TOTTEN,
JOHN F. WILL.